United States Patent [19]

Kim

[11] Patent Number: 5,748,581
[45] Date of Patent: May 5, 1998

[54] OPTICAL HEAD OF AN OPTICAL DISC RECORDING/REPRODUCING APPARATUS HAVING A POLYGONAL PRISM

[76] Inventor: Jin Tae Kim, 117-301 Jukong Apartment, 767 Sangkye 6-Dong, Noweon-Ku, Seoul, Rep. of Korea

[21] Appl. No.: 602,056

[22] Filed: Feb. 15, 1996

[51] Int. Cl.⁶ ................................................. G11B 7/00
[52] U.S. Cl. ................................. 369/44.23; 369/112
[58] Field of Search ............................. 369/44.23, 44.14, 369/112, 110, 44.37, 44.41; 367/116, 109

[56] References Cited

U.S. PATENT DOCUMENTS

| | | | |
|---|---|---|---|
| 4,817,072 | 3/1989 | Toide et al. | 369/44.23 |
| 5,272,685 | 12/1993 | Ando | 369/44.14 |
| 5,438,562 | 8/1995 | Kobayashi et al. | 369/110 |
| 5,541,906 | 7/1996 | Kobayashi | 369/112 |

Primary Examiner—Thang V. Tran

[57] ABSTRACT

Disclose is a optical head having reduced elements and a simplified construction, thereby having a reduced size. In the optical head, the transmitting path of the optical beam is shortened and energy loss of the optical head is reduced. The optical head has a polygonal prism having a first and a second reflecting surfaces. The laser beam radiated from a laser source is reflected by the first reflecting surface and focused on an optical disc, and an information laser beam reflected by the optical disc is transmitted through or reflected by the first and the second reflecting surfaces, and then is incident upon the first and the second light-receiving regions of a single light-receiving element. The optical head records and reproduces information on and from the optical disc and performs a focusing servo and a tracking servo of the objective lens by utilizing data of the reflected information beam received by the first and the second light-receiving regions.

13 Claims, 4 Drawing Sheets

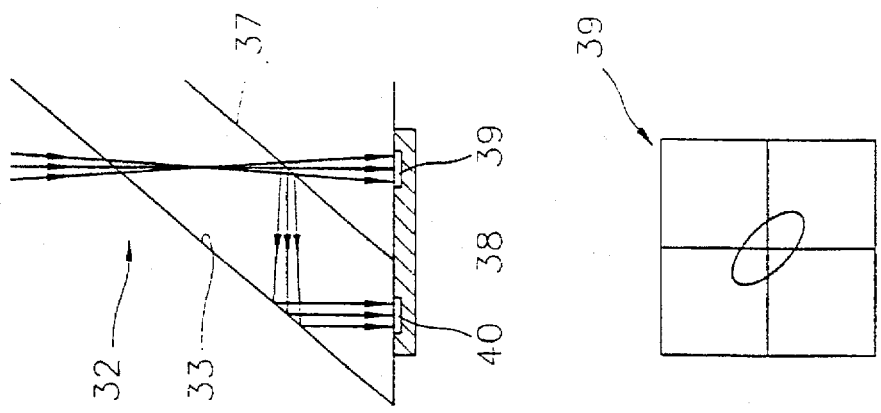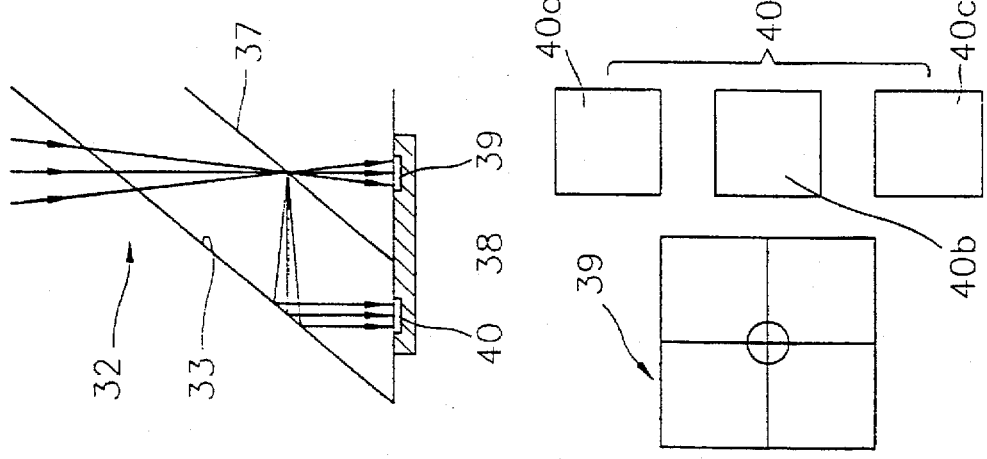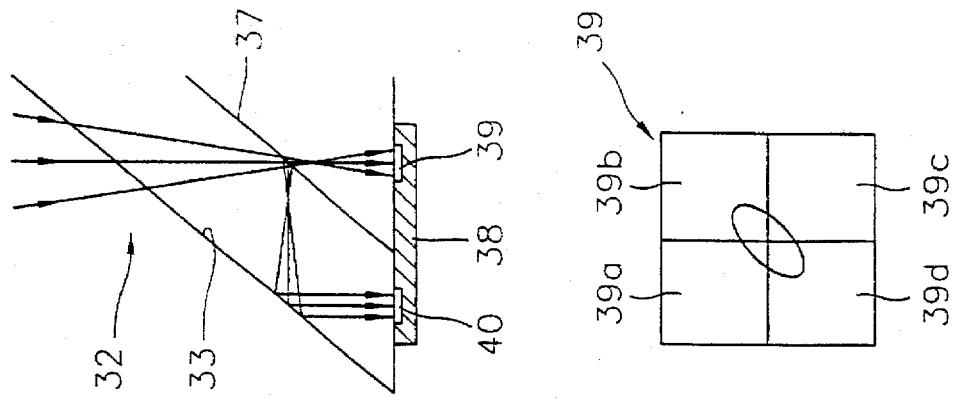

OPTICAL HEAD OF AN OPTICAL DISC RECORDING/REPRODUCING APPARATUS HAVING A POLYGONAL PRISM

BACKGROUND OF THE INVENTION

1. Field of the Invention

The present invention relates to an optical head of an optical disc recording/reproducing apparatus, and more particularly to an optical head capable of recording/reproducing information on/from an optical disc and performing the focusing servo and the tracking servo by means of a single light-receiving element, thereby simplifying the construction and reducing the energy loss of an optical disc recording/reproducing apparatus.

2. Prior Arts

An optical disc recording/reproducing apparatus records and reproduces information on and from an optical disc by converging optical beams on the optical disc. Among information recording/reproducing media by the optical disc recording/reproducing apparatus, a magneto-optical disc is a high-density memory means which has a large capacity and on which information can be erasably recorded.

When the optical disc recording/reproducing apparatus records information on an optical disc, an optical beam radiated from a semiconductor laser is focused on an information recording surface of the optical disc as a shape of beam spots and elevates the temperature of the information recording surface up to the Curie point. Then, the information recording surface loses coercive force and is magnetized corresponding to the given external magnetic field. Thereafter, the radiation of the optical beam is stopped and the external magnetic field is maintained as it is, and the temperature of the information recording surface is lowered. When the temperature comes down under the Curie point, the recording of the information is completed, and the magnetized information recording surface is maintained as it is even though the external magnetic field is changed.

When the optical disc recording/reproducing apparatus reproduces information from an optical disc, a semiconductor laser radiates an optical beam at a temperature below the Curie point onto the information recording surface of the optical disc. Then, the information recording surface has a Kerr effect, or magneto-optical effect, on the focused optical beam, so that the polarizing plane of the optical beam is rotated with such an angle depending upon the magnetized state of the information recording surface. The optical disc recording/reproducing apparatus reproduces the information on the optical disc by detecting the magnetized state of the information recording surface based on the rotated angle of the polarizing plane.

An optical disc has an information track and a guide track formed thereon in concentric or spiral shape at an interval of about 1.6 micrometer apart. The optical disc recording/reproducing apparatus records/reproduces data on/from a predetermined position of the information track by means of the guide track. Therefore, the optical disc recording/reproducing apparatus performs focusing servo and tracking servo in order to exactly record and reproduce data on and from the optical disc. That is, the optical disc recording/reproducing apparatus controls the optical beam to be exactly focused on the information track and to exactly follow the guide track.

In the optical disc recording/reproducing apparatus, an optical head detects servo error signals including focusing error signal and tracking error signal, and an objective lens actuator adjusts an objective lens along the focusing and tracking direction based on the detected servo error signals.

FIG. 1 is a schematic constructional view of a conventional optical head 10 for an optical disc recording/reproducing apparatus as described above. In optical head 10, a linearly polarized optical beam radiated from semiconductor laser 11 is transformed into a parallel optical beam through a collimator lens 12 and then is transmitted through a beam splitter 13. Then, the optical beam is focused on the information recording surface of an optical disc 15 through an objective lens 14 with a shape of beam spots. The optical beam is reflected by the information recording surface, and the polarizing plane of the optical beam is diffracted at an angle that depends on the magnetized state of the focused region of the information recording surface, so that the reflected optical beam has information therein. The informational optical beam is again transmitted through objective lens 14 and is incident into beam splitter 13. The incident informational optical beam is reflected by the first reflecting surface 13a and then is transmitted in a direction a1.

The informational optical beam is divided into two components by the second reflecting surface 13b. One component of the informational optical beam is transmitted in a direction b1 toward a servo error signal detecting optical system which includes a condenser 16, a cylindrical lens 17, and a light-receiving element 18. The servo error signal detecting optical system detects focusing error signal and tracking error signal from the informational optical beam by means of the astigmatism method and the push-pull method.

Meanwhile, the other component of the informational optical beam is transmitted in a direction b2 toward a data signal detecting optical system which includes a half-wave plate 19, a condenser 20, a beam splitter 21, and a pair of light-receiving elements 22 and 23, and it is decoded by the data signal detecting optical system. Because it has double light-receiving elements 22 and 23, the data signal detecting optical system can remove even noise having the same phase as that of the informational optical beam therefrom, so that it can reproduce information of high quality.

However, since the above described optical head 10 has a plurality of optical elements such as the servo error signal detecting optical system, a data signal detecting optical system, and a pair of light-receiving elements 22 and 23, the construction of optical head 10 is complicated and the size of optical head 10 is increased. Further, the energy loss of the optical beam is increased and the optical efficiency of the optical disc recording/reproducing apparatus is lowered because the optical beam is transmitted through various optical elements.

To solve the above described problems, various efforts for simplifying the construction and reducing the size of the optical disc recording/reproducing apparatus have been tried.

U.S. Pat. No. 5,331,622 issued to Ernst et al. discloses an optical head in which the elements are reduced and the optical energy loss is minimized. Ernst's optical head includes an objective lens, a laser diode/photodetector package, and a half cube beamsplitter. In Ernst's optical head, transmitting path of the optical beam is shortened and the optical energy loss is reduced, thereby the optical efficiency of the optical head is considerably elevated. However, Ernst's optical head has a limitation in that it requires a conjugate objective lens because the laser diode and the photodetector are constructed as one assembly in Ernst's optical head. Further, it is not easy to perform focusing servo with respect to the conjugate objective lens.

SUMMARY OF THE INVENTION

The present invention has been made to overcome the above described problems of the prior arts, and accordingly it is an object of the present invention to provide an optical head which has reduced elements and a simplified construction, thereby reducing the size of the optical head, shortening the transmitting path of the optical beam, and reducing the energy loss of the optical head.

To achieve the above object, the present invention provides an optical head of an optical disc recording/reproducing apparatus for recording and reproducing information on and from an optical disc, the optical head comprising:

a laser source for radiating a laser beam;

an objective lens;

a first light-receiving element; and means for orienting the laser beam radiated from the laser source through the objective lens toward the optical disc and for orienting a reflected laser beam reflected by the optical disc toward the first light-receiving element, the first light-receiving element providing data by detecting the reflected laser beam transmitted through the orienting means, the optical head recording and reproducing the information on and from the optical disc based on the data, the optical head performing a focusing servo and a tracking servo of the objective lens based on the data.

Preferably, the optical head of the present invention further comprises means for dividing the laser beam into one main beam and two sub beams, the orienting means orienting said one main beam and said two sub beams toward the optical disc through the objective lens.

The orienting means comprises a polygonal prism having a first reflecting surface and a second reflecting surface.

The polygonal prism comprises a half-cube prism and a parallelepiped prism, the parallelepiped prism having a first and a second longer-side legs, and a lower and an upper shorter-side legs, the half-cube prism having a hypotenuse, a rear leg, and a lower leg, the first longer-side leg of the parallelepiped prism being arranged to face the objective lens and the laser diode, the second longer-side leg of the parallelepiped prism being attached to the hypotenuse of the half-cube prism, the first longer-side leg forming the first reflecting surface, and the second longer-side leg and the hypotenuse forming the second reflecting surface.

It is preferred that the first reflecting surface is a modified polarizing beam splitting surface, and the second reflecting surface is polarizing beam splitting surface.

The first light-receiving element comprises a first light-receiving region and a second light-receiving region, the first light-receiving region being attached to the lower leg of the half-cube prism and the second light-receiving region being attached to the lower shorter-side leg of the parallelepiped prism.

The first light-receiving region comprises a first, a second, a third, and a fourth light-receiving partitions adjacent to each other, and the second light-receiving region comprises a fifth, sixth, and a seventh light-receiving partitions arranged in series, the optical head recording and reproducing the information on and from the optical disc and performing a focusing servo and a tracking servo of the objective lens based on intensities of the first and the second components of the reflected laser beam detected by the first, the second, the third, the fourth, the fifth, the sixth, and the seventh light-receiving partitions In the optical head according to the present invention as described above, the first component of the laser beam reaching the first reflecting surface is reflected by the first reflecting surface and then oriented toward the objective lens, and that the second component of the laser beam reaching the first reflecting surface is transmitted straight through the first reflecting surface toward the rear leg of the half-cube prism.

The reflected laser beam reflected by the optical disc and transmitted through the objective lens is transmitted through the first reflecting surface and arrives at the second reflecting surface. The reflected laser beam arriving at the second reflecting surface is divided into a first component and a second components by the second reflecting surface, the first component of the reflected laser beam being transmitted straight through the second reflecting surface and being detected by the first light-receiving region of the first light-receiving element, and the second component of the reflected laser beam being reflected by the second reflecting surface and being oriented toward the first reflecting surface, and then the second component of the reflected laser beam being reflected again by the first reflecting surface and being detected by the second light-receiving region of the first light-receiving element.

The optical head records and reproduces information on and from the optical disc and performs a focusing servo and a tracking servo of the objective lens based on the intensities of the first and the second components of the reflected laser beam detected by the first through the seventh light-receiving partitions.

BRIEF DESCRIPTION OF THE DRAWINGS

The above object, and other features and advantages of the present invention will become more apparent by describing in detail preferred embodiments thereof with reference to the attached drawings, in which:

FIGS. 4A, 4B, and 4C are plan views of the first light-receiving element of the optical head shown in FIG. 2 for showing the shapes of the reflected optical beams incident thereon.

DESCRIPTION OF THE PREFERRED EMBODIMENTS

A preferred embodiment of the present invention will be described in detail with reference to the accompanying drawings.

Figure 1:
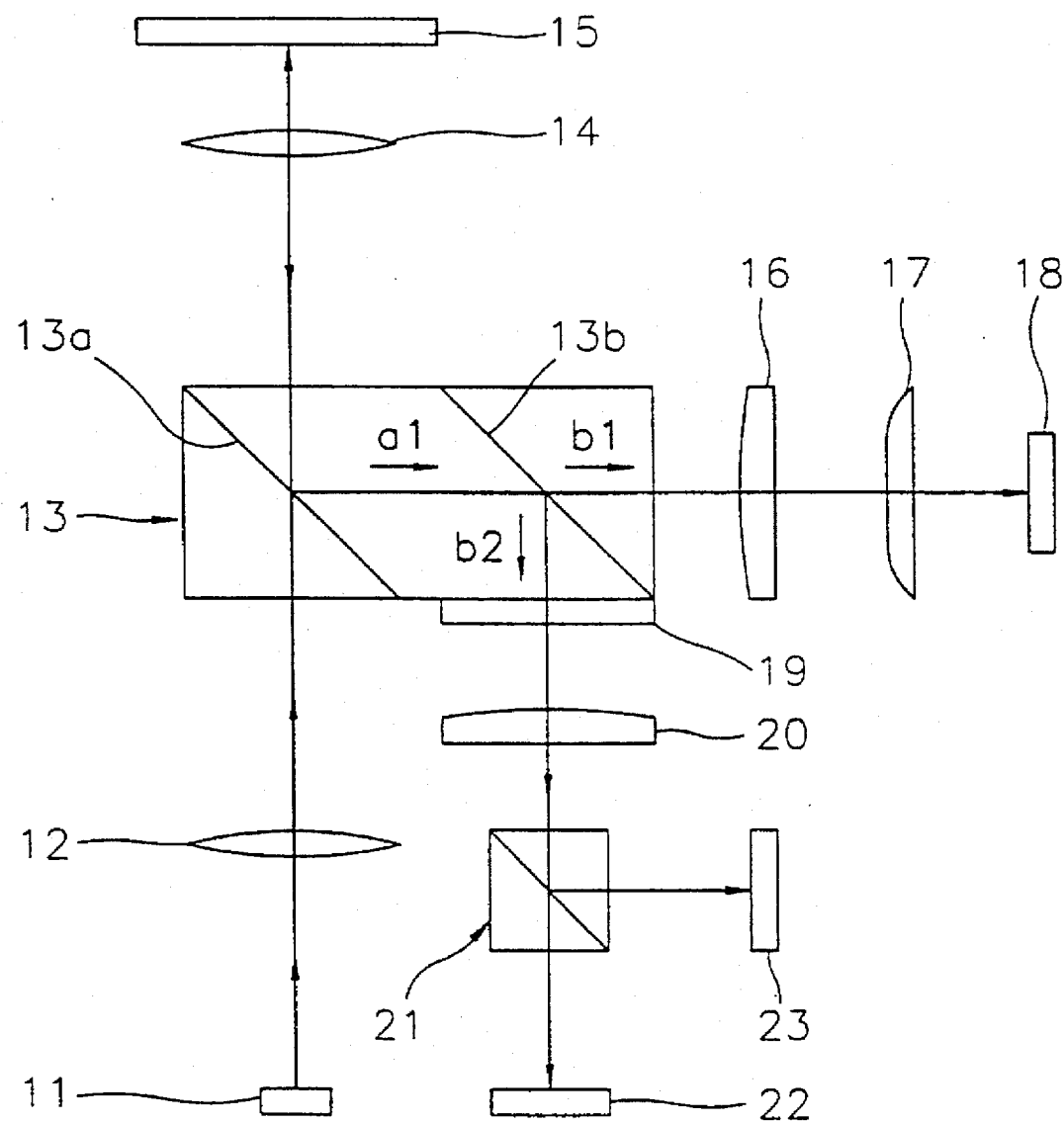
FIG. 1 is a schematic constructional view of a conventional optical head of an optical disc recording/reproducing apparatus.
Figure 2:
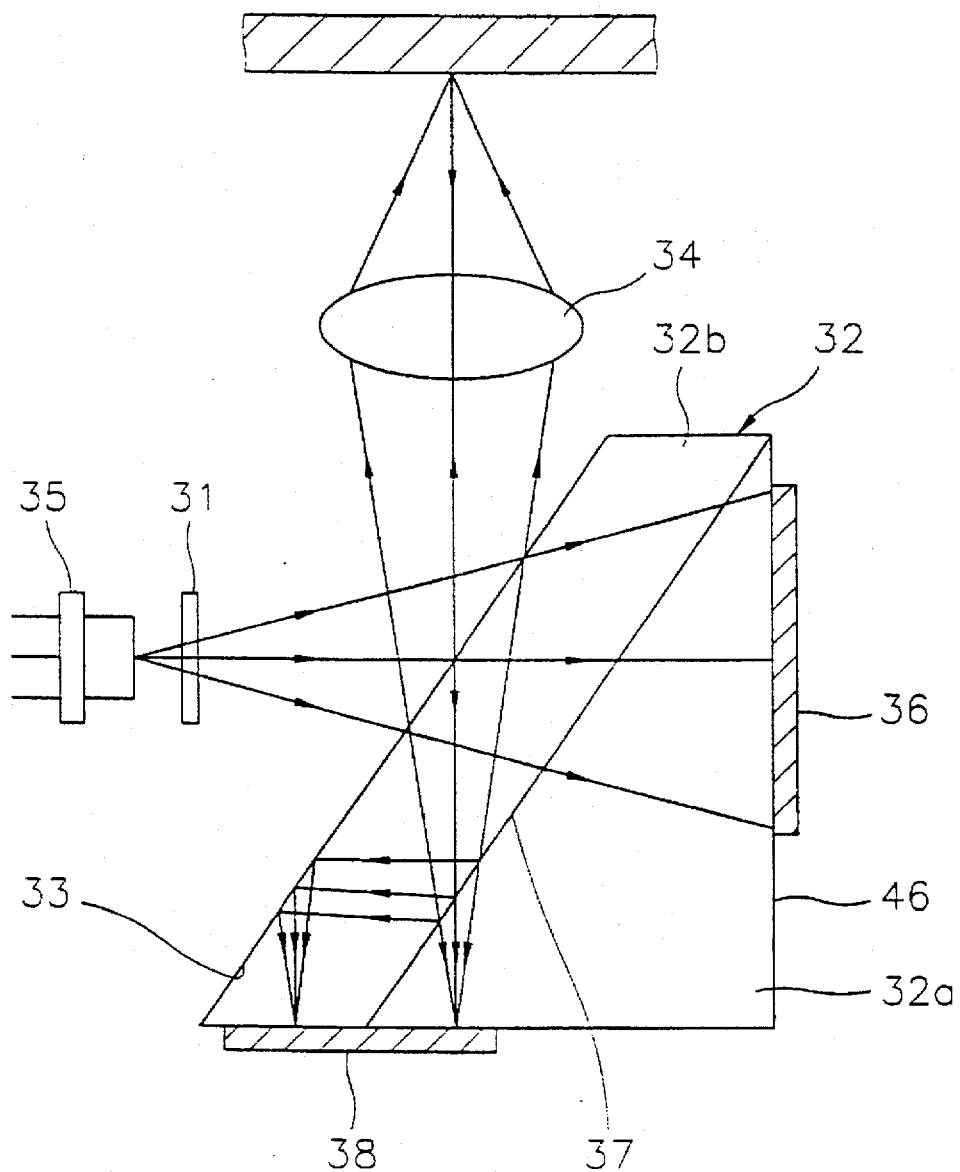
FIG. 2 is a schematic constructional view of an optical head of an optical disc recording/reproducing apparatus according to a preferred embodiment of the present invention.

FIG. 2 schematically illustrates an optical head 30 of an optical disc recording/reproducing apparatus according to a preferred embodiment of the present invention. Reference numeral 50 designates an optical disc, an information recording medium. As shown, optical head 30 includes a laser diode 35, a diffraction plate 31, a polygonal prism 32, a first light-receiving element 38, a second light-receiving element 36, and an objective lens 34.

Laser diode 35 radiates a laser beam to record or reproduce information on or from optical disc 50. Diffraction plate 31 divides the laser beam radiated from laser diode 35 into three beams including one main beam and two sub beams.

Polygonal prism 32 forms the first beam path for orienting the three divided laser beams toward optical disc 50 and the second beam path for the laser beam reflected from optical disc 50 through objective lens 34.

Polygonal prism 32 includes a half-cube prism 32a and a parallelepiped prism 32b.

Figure 3:
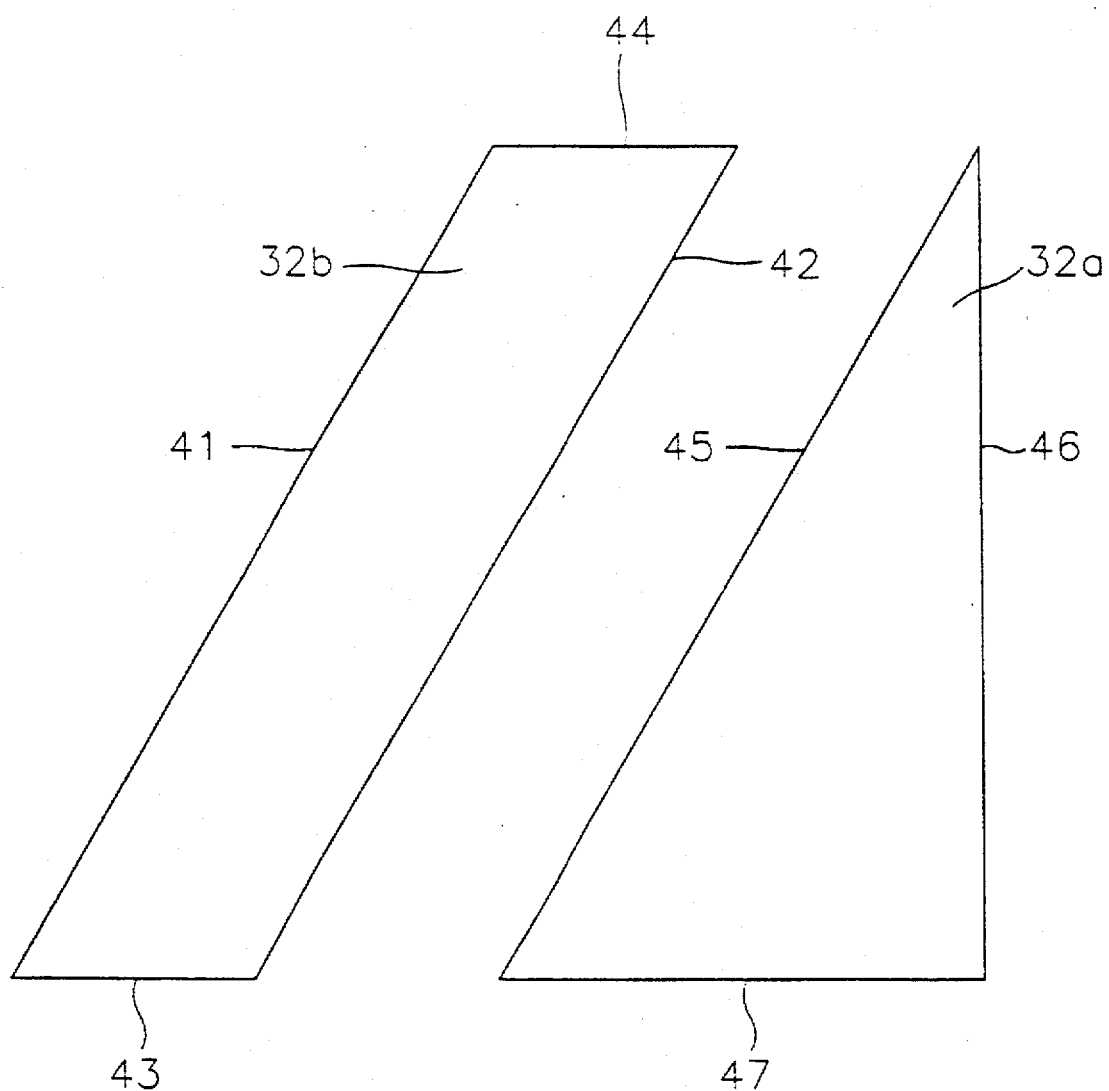
FIG. 3 is an exploded view of a polygonal prism of the optical head shown in FIG. 2.

In the meantime, referring to FIG. 3, parallelepiped prism 32b has a first and a second longer-side legs 41 and 42, and a lower and an upper shorter-side legs 43 and 44. Half-cube prism 32a has a hypotenuse 45, a rear leg 46, and a lower leg 47.

Referring again to FIG. 2, first longer-side leg 41 of parallelepiped prism 32b is arranged to face objective lens 34 and laser diode 35. A normal line through laser diode 35 has the same incident angle as that of a normal line through objective lens 34 with respect to first longer-side leg 41, so that the laser beam radiated from laser diode 35 and reflected by first longer-side leg 41 is transmitted through objective lens 34 to optical disc 50.

Second longer-side leg 42 of parallelepiped prism 32b is attached to hypotenuse 45 of half-cube prism 32a by means of adhesive or coating. Therefore, lower leg 47 of half-cube prism 32a and lower shorter-side leg 43 of parallelepiped prism 32b are connected to each other and form one integrated surface.

Meanwhile, second longer-side leg 42 forms a first reflecting surface 33 of polygonal prism 32, and the attached second longer-side leg 42 and hypotenuse 45 forms a second reflecting surface 37. Preferably, the first reflecting surface 33 is a modified polarizing beam splitting surface and the second reflecting surface 37 is a polarizing beam splitting surface.

Between laser diode 35 and first reflecting surface 33 of polygonal prism 32 is disposed diffraction plate 31.

The second light-receiving element 36 is attached to rear leg 46 of half-cube prism 32a, and the first light-receiving element 38 is attached to the connected lower leg 47 of half-cube prism 32a and lower shorter-side leg 43 of parallelepiped prism 32b.

Optical head 30 controls the intensity of the laser beam radiated from laser diode 35 based on the laser beam signal received by second light-receiving element 36. Optical head 30 detects focusing error and tracking error and records/reproduces information on/from optical disc 50 based on the laser beam signal received by first light-receiving element 38.

The first light-receiving element 38 includes a first light-receiving region 39 and a second light-receiving region 40. The first light-receiving region 39 is attached to lower leg 47 of half-cube prism 32a and the second light-receiving region 40 is attached to lower shorter-side leg 43 of parallelepiped prism 32b.

Referring to FIGS. 4A through 4C, the first light-receiving region 39 has a first, a second, a third, and a fourth light-receiving partitions 39a, 39b, 39c, and 39d adjacent to each other, and the second light-receiving region 40 has a fifth, a sixth, and a seventh light-receiving partitions 40a, 40b, and 40c arranged in series.

Hereinafter, the transmitting path of the laser beam in optical head 30 of the optical disc recording/reproducing apparatus according to an embodiment of the present invention will be described.

First, laser diode 35 generates and radiates a laser beam toward first reflecting surface 33 of polygonal prism 32. The laser beam radiated from laser diode 35 is divided into three beams including one main beam and two sub beams by diffraction plate 31 disposed between laser diode 35 and polygonal prism 32. The divided three beams proceed toward first reflecting surface 33.

A part of the three laser beams arriving at first reflecting surface 33 is reflected by first reflecting surface 33 and then oriented toward objective lens 34, the other part of the three beams is transmitted straight through first reflecting surface 33 and detected by second light-receiving element 36.

The second light-receiving element 36 estimates the detected laser beams and provides the estimated data for a driving means (not shown) for driving laser diode 35, and the driving means regulates the laser-radiating intensity of laser diode 35.

Meanwhile, the three laser beams reflected by first reflecting surface 33 are incident through objective lens 34 on an information recording surface formed on optical disc 50. The incident laser beams are reflected by the information recording surface and modulated to information beams corresponding to the shapes of pits recorded on the information recording surface. The modulated information beams are transmitted again through objective lens 34 into polygonal prism 32.

The reflected information beams are transmitted through first reflecting surface 33 and arrive at second reflecting surface 37. A part of the reflected information beams arriving at second reflecting surface 37, such as P wave, is transmitted straight through second reflecting surface 37 due to the polarizing characteristics of second reflecting surface 37. The first light-receiving region 39 of first light-receiving element 38 attached to lower leg 47 of half-cube prism 32a detects the part of the reflected information beams.

On the other hand, the other part of the reflected information beams arriving at second reflecting surface 37, such as S wave, is reflected by second reflecting surface 37 and oriented toward first reflecting surface 33. Then, this other part of the reflected information beams is reflected again by first reflecting surface 33 and detected by second light-receiving region 40 of first light-receiving element 38.

Optical head 30 estimates the focusing error and the tracking error by means of two different reflected beams detected respectively by first light-receiving region 39 and second light-receiving region 40 of first light-receiving element 38 as described above, and then performs focusing servo and tracking servo based on the estimated result.

Hereinbelow will be described the process of performing focusing servo and tracking servo and the process of recording/reproducing information on/from optical disc 50 by optical head 30 of the optical disc recording/reproducing apparatus according to an embodiment of the present invention as described above, while referring to FIGS. 4A through 4C.

If the intensities of the laser beams detected by the first, the second, the third, and the fourth light-receiving partitions 39a, 39b, 39c, and 39d of the first light-receiving region 39 and the fifth, the sixth, and the seventh light-receiving partitions 40a, 40b, and 40c of the second light-receiving region 40 are put as INa, INb, INc, INd, INe, INf, and INg, then the focusing error FE is obtained by an equation, $$FE=(INa+INc)-(INb+INd).$$

In this case, if FE is equal to zero, it means that the focusing servo is being normally performed, as shown in FIG. 4B. If FE is less than zero, it means that objective lens 34 is too close to optical disc 50, as shown in FIG. 4A. If FE is larger than zero, it means that objective lens 34 is too far from optical disc 50, as shown in FIG. 4C.

Therefore, when FE is not equal to zero, optical head 30 makes a focusing servo actuator (not shown) adjust the interval between optical disc 50 and objective lens 34.

The tracking error is estimated based on the difference between the laser beam intensities respectively detected by fifth light-receiving partition 40a and seventh light-receiving partition 40c by means of the three beam method. The estimated tracking error is transferred to the tracking servo actuator (not shown), and the tracking servo actuator drives objective lens 34 so that the focus of objective lens 34 may exactly follow the guide track on optical disc 50.

Meanwhile, the intensities of the laser beams INa, INb, INc, INd, INe, INf, and INg detected by the first, the second, the third, and the fourth light-receiving partitions 39a, 39b, 39c, and 39d of the first light-receiving region 39 and the fifth, the sixth, and the seventh light-receiving partitions 40a, 40b, and 40c of the second light-receiving region 40 are also utilized when optical head 30 records/reproduces information on/from optical disc 50.

When optical head 30 records information on optical disc 50, the difference Sdif between the intensities INa, INb, INc, INd, and INf of the laser beams detected by the first, the second, the third, and the fourth light-receiving partitions 39a, 39b, 39c, and 39d, and the sixth light-receiving partition 40b is utilized, in which $Sdif=(INa+INb+INc+INd)-INf$.

When optical head 30 reproduces information from optical disc 50, the sum Ssum of the intensities INa, INb, INc, INd, and INf of the laser beams detected by the first, the second, the third, the fourth, and the sixth light-receiving partitions 39a, 39b, 39c, 39d, and 40b is utilized, in which $Ssum=(INa+INb+INc+INd)+INf$.

As described above, optical head 30 of the optical disc recording/reproducing apparatus according to the present invention performs the focusing servo and the tracking servo and records/reproduces information on/from optical disc 50 by means of just a single light-receiving element, that is first light-receiving element 38. Therefore, optical head 30 does not require separate servo error signal detecting optical system and data signal detecting optical system, and thereby the number of elements of optical head 30 is reduced and the construction of optical head 30 is simplified. In addition, the transmitting path of the laser beam is shortened, and thereby loss of optical energy is reduced.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. An optical head of an optical disc recording/reproducing apparatus for recording and reproducing an information on and from an optical disc, the optical head comprising:

a laser source for radiating a laser beam;

an objective lens;

a first light-receiving element; and means for orienting the laser beam radiated from the laser source through the objective lens toward the optical disc and for orienting a reflected laser beam reflected by the optical disc toward the first light-receiving element, the orienting means comprising a polygonal prism having a first reflecting surface and a second reflecting surface, the polygonal prism comprising a half-cube prism and a parallelepiped prism, the parallelepiped prism having a first and a second longer-side legs, and a lower and an upper shorter-side legs, the half-cube prism having a hypotenuse, a rear leg, and a lower leg, the first longer-side leg of the parallelepiped prism being arranged to face the objective lens and the laser diode, the second longer-side leg of the parallelepiped prism being attached to the hypotenuse of the half-cube prism, the first longer-side leg forming the first reflecting surface and the second longer-side leg and the hypotenuse forming the second reflecting surface, the first light-receiving element providing data by detecting the reflected laser beam transmitted through the orienting means, so that the optical head records and reproduces the information on and from the optical disc and performs a focusing servo and a tracking servo of the objective lens based on the data.

2. An optical head as claimed in claim 1 further comprising means for dividing the laser beam into one main beam and two sub beams, the orienting means orienting said one main beam and said two sub beams toward the optical disc through the objective lens.

3. An optical head as claimed in claim 2, wherein the dividing means comprises a diffraction plate disposed between the laser source and the orienting means.

4. An optical head as claimed in claim 1, wherein the objective lens is disposed between the optical disc and the orienting means.

5. An optical head as claimed in claim 1, wherein a first normal line through the laser diode has an incident angle with respect to the first longer-side leg equal to that of a second normal line through the objective lens, so that the laser beam radiated from the laser diode and reflected by the first longer-side leg is transmitted through the objective lens to the optical disc.

6. An optical head as claimed in claim 1, wherein the first reflecting surface is a modified polarizing beam splitting surface, the laser beam being divided into a first and a second components by the first reflecting surface, so that the first component of the laser beam reached at the first reflecting surface is reflected by the first reflecting surface and then oriented toward the objective lens, and that the second component of the laser beam reached at the first reflecting surface is transmitted straight through the first reflecting surface toward the rear leg of the half-cube prism.

7. An optical head as claimed in claim 6 further comprising means for detecting an intensity of the laser beam by the laser source so as to control the intensity of the laser beam.

8. An optical head as claimed in claim 7, wherein the detecting means comprises a second light-receiving element attached to the rear leg of the half-cube prism, the second light-receiving element detecting the second component of the laser beam so as to control the intensity of the laser beam.

9. An optical head as claimed in claim 1, wherein the lower leg of the half-cube prism and the lower shorter-side leg of the parallelepiped prism are connected to each other and form one integrated surface, the first light-receiving element being attached to the one integrated surface.

10. An optical head as claimed in claim 9, wherein the first light-receiving element comprises a first light-receiving region and a second light-receiving region, the first light-receiving region being attached to the lower leg of the half-cube prism and the second light-receiving region being attached to the lower shorter-side leg of the parallelepiped prism.

11. An optical head as claimed in claim 10, wherein the second reflecting surface is a polarizing beam splitting surface, so that the reflected laser beam reflected by the optical disc and transmitted through the objective lens is transmitted through the first reflecting surface and arrives at the second reflecting surface, the reflected laser beam arriving at the second reflecting surface being divided into a first component and a second component by the second reflecting surface, the first component of the reflected laser beam being transmitted straight through the second reflecting surface and being detected by the first light-receiving region of the first light-receiving element, the second component of the reflected laser beam being reflected by the second reflecting surface and being oriented toward the first reflecting surface, and then the second component of the reflected laser beam being reflected again by the first reflecting surface and being detected by the second light-receiving region of the first light-receiving element.

12. An optical head as claimed in claim 11, wherein the first light-receiving region comprises a first, a second, a third, and a fourth light-receiving partitions adjacent to each other, and the second light-receiving region comprises a fifth, sixth, and a seventh light-receiving partitions arranged in series, the optical head recording and reproducing the information on and from the optical disc and performing a focusing servo and a tracking servo of the objective lens based on intensities of the first and the second components of the reflected laser beam detected by the first, the second, the third, the fourth, the fifth, the sixth, and the seventh light-receiving partitions.

13. An optical head of an optical disc recording/reproducing apparatus for recording and reproducing an information on and from an optical disc, the optical head comprising:

a laser source for radiating a laser beam;

a diffraction plate for dividing the laser beam into one main beam and two sub beams;

an objective lens;

a polygonal prism including a half-cube prism and a parallelepiped prism, the parallelepiped prism having a first and a second longer-side legs, and a lower and an upper shorter-side legs, the half-cube prism having a hypotenuse, a rear leg, and a lower leg, the first longer-side leg of the parallelepiped prism being arranged to face the objective lens and the laser diode, the second longer-side leg of the parallelepiped prism being attached to the hypotenuse of the half-cube prism, the first longer-side leg forming a first reflecting surface, and the second longer-side leg and the hypotenuse forming a second reflecting surface, a first normal line through the laser diode having an incident angle with respect to the first longer-side leg equal to that of a second normal line through the objective lens, the first reflecting surface being a modified polarizing beam splitting surface, said one main beam and two sub beams being divided into a first and a second components by the first reflecting surface, so that the first component of said one main beam and two sub beams reaching the first reflecting surface is reflected by the first reflecting surface and then oriented toward the objective lens, and that the second component of said one main beam and two sub beams reaching the first reflecting surface is transmitted straight through the first reflecting surface toward the rear leg of the half-cube prism;

a first light-receiving element including a first light-receiving region and a second light-receiving region, the first light-receiving region being attached to the lower leg of the half-cube prism and the second light-receiving region being attached to the lower shorter-side leg of the parallelepiped prism, the second reflecting surface being a polarizing beam splitting surface, so that an information laser beam reflected by the optical disc and transmitted through the objective lens is transmitted through the first reflecting surface and arrives at the second reflecting surface, the information laser beam arriving at the second reflecting surface being divided into a first component and a second component by the second reflecting surface, the first component of the information laser beam being transmitted straight through the second reflecting surface and being detected by the first light-receiving region of the first light-receiving element, the second component of the information laser beam being reflected by the second reflecting surface toward the first reflecting surface, and then the second component of the information laser beam being reflected again by the first reflecting surface and being detected by the second light-receiving region of the first light-receiving element, the first light-receiving region having a first, a second, a third, and a fourth light-receiving partitions adjacent to each other, and the second light-receiving region having a fifth, sixth, and a seventh light-receiving partitions arranged in series, the lower leg of the half-cube prism and the lower shorter-side leg of the parallelepiped prism being connected to each other to form one integrated surface; and a second light-receiving element attached to the rear leg of the half-cube prism, the second light-receiving element detecting the second component of said one main beam and two sub beams so as to control the intensity of the laser beam radiated by the laser source, the optical head recording and reproducing the information on and from the optical disc and performing a focusing servo and a tracking servo of the objective lens based on intensities of the first and the second components of the reflected laser beam detected by the first, the second, the third, the fourth, the fifth, the sixth, and the seventh light-receiving partitions.

* * * * *